United States Patent [19]
Miller et al.

[11] Patent Number: 5,478,512
[45] Date of Patent: Dec. 26, 1995

[54] METHOD OF DETECTING CAM OVERLOAD IN A PLASTIC MOLDING APPARATUS

[75] Inventors: Peter S. Miller, Crawfordsville, Ind.; Steven Lewellen, deceased, late of Lafayette, Ind., by Arthur B. Lewellen, legal representative

[73] Assignee: H-C Industries, Inc., Crawfordsville, Ind.

[21] Appl. No.: 229,583

[22] Filed: Apr. 19, 1994

[51] Int. Cl.⁶ .............................. B29C 43/58; B29C 43/04
[52] U.S. Cl. ................... 264/40.5; 264/40.7; 264/297.6; 425/138; 425/150; 425/154; 425/345
[58] Field of Search .................................. 264/40.1, 40.7, 264/40.5, 297.1, 297.6, 297.8; 425/149, 150, 138, 154, 345, 347, 575, 576

[56] References Cited

U.S. PATENT DOCUMENTS

| | | | |
|---|---|---|---|
| 3,758,245 | 9/1973 | Hermes | 425/150 |
| 4,497,765 | 2/1985 | Wilde et al. | |
| 4,640,673 | 2/1987 | Takeda et al. | |
| 4,776,782 | 10/1988 | Murayama et al. | |
| 4,938,370 | 7/1990 | McBride | |
| 5,211,964 | 5/1993 | Prytherch et al. | 425/150 |

*Primary Examiner*—Jill L. Heitbrink
*Attorney, Agent, or Firm*—Dressler, Goldsmith, Shore & Milnamow, Ltd.

[57] ABSTRACT

A monitoring system provides a method of operating a compression plastic molding apparatus which entails substantially continuously monitoring the position of an upper compression cam of the apparatus, against which a rotatably movable mold assembly reacts during operation of the apparatus. By monitoring the position of the compression cam, the system is able to detect excessive loading of the apparatus, such as attendant to depositing of excessive plastic material in the mold assembly. A force determining device, illustrated in the form of a fluid pressure (pneumatic) cylinder, is operatively connected with the compression cam, with the system operating to release pressure in the cylinder in the event that the compression cam is moved in a manner which indicates excessive loading of the plastic mold assembly.

8 Claims, 1 Drawing Sheet

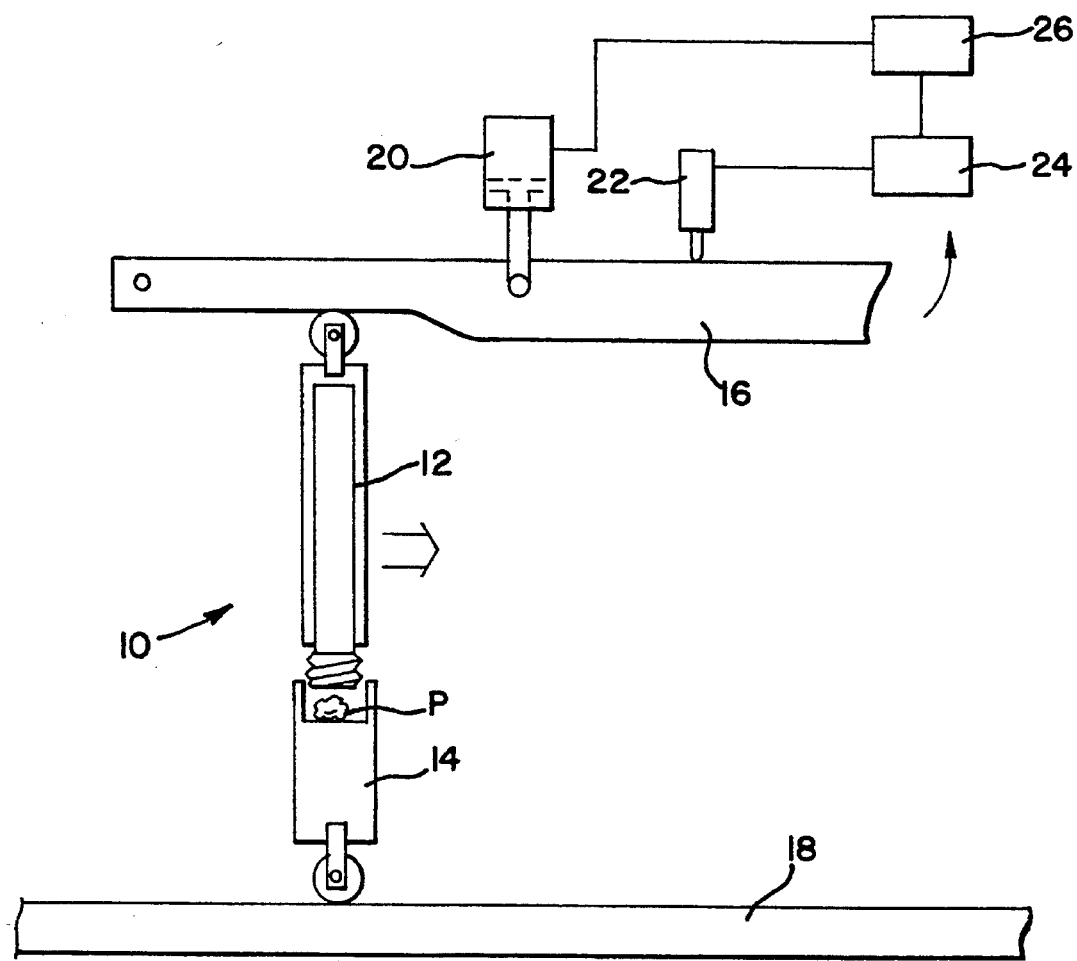

1

METHOD OF DETECTING CAM OVERLOAD IN A PLASTIC MOLDING APPARATUS

TECHNICAL FIELD

The present invention relates generally to a method for compression molding plastic articles such as threaded plastic closures, and more particularly to a method for detecting overloading of a compression cam of the apparatus, and for operating the apparatus to prevent excessive loading of mold tooling and associated components such as attendant to depositing of excessive plastic material in a mold assembly.

BACKGROUND OF THE INVENTION

U.S. Pat. No. 4,497,765, hereby incorporated by reference, discloses an apparatus for compression molding plastic closures which has proven to be highly commercially successful. The method of operating the molding apparatus entails depositing a predetermined quantity of molten plastic material, typically polypropylene, in a female mold cavity, with a male mold plunger thereafter inserted into the cavity to compression mold the molten plastic. After cooling, the closure shell thus formed is removed from the mold assembly by opening of the male and female components. In accordance with the above-referenced patent, a sealing liner is similarly compression molded within the molded closure shell, by depositing a predetermined quantity of molten plastic in the shell, followed by compression molding of the liner material with a forming plunger inserted into the shell.

The above-described compression molding of the closure shell (as well as molding of the closure liner) is effected through the use of a rotary turret molding apparatus. The apparatus for molding the closure includes a plurality of cooperating sets of male and female molds, which are positioned about the periphery of a rotating turret or carousel. Relative movement of the male and female mold portions is effected by movement of each mold tooling assembly with respect to cams of the molding apparatus. These cams effect closing of the mold, and compression of the molten plastic material, as well as opening of the molds for removal of the molded closure shells.

Commercial embodiments of this type of molding apparatus are capable of relatively high-speed operation, molding hundreds of closures per minute. To achieve these high rates of production, high speed cutting devices are employed for delivering the predetermined quantities ("pellets" or "charges") of molten plastic material from an associated extruder respectively to each of the female mold cavities. However, attendant to high-speed operation, misplacement of the metered plastic material can result in one of the female cavities improperly receiving a "double pellet", that is, significantly more than the predetermined quantity of molten plastic material. Under these circumstances, cam-actuated closing of the mold assembly can result in excessively high stresses being created within the mold tooling, as well as on the cams of the molding apparatus.

In current machines, this production problem has been addressed by employing pneumatic cylinders to position the compression cam of the molding apparatus. The pneumatic cylinder is pressurized to, in effect, limit the force between the reactive surfaces of the compression cam and the cam follower of the mold assembly. In conjunction with the pneumatic cylinder, a pair of mechanically-actuated limit switches are employed for detecting movement of the compression cam in excess of a normal range, which movement is indicative of a mold having received a significant excess of molten plastic material. The limit switches are sequentially arranged such that actuation of the first switch stops the flow of molten plastic material, while actuation of the second switch, indicating relatively greater movement of the compression cam, stops the apparatus. In conjunction with actuation of one or both of the switches, pneumatic pressure to the pneumatic cylinder holding the cam in position is released, thus acting to prevent excessive strain of the various components.

In practice, proper adjustment of the mechanical limit switches has proven difficult. Not only are the switches subject to vibration which can interfere with their proper positioning, misadjustment of the switches so that they are actuated too easily can result in unnecessary "nuisance trips", while misadjustment such that the switches do not properly react to excessive plastic in the mold can defeat the intended function of the switches.

SUMMARY OF THE INVENTION

The present invention is directed to a system which provides a method of operating a plastic molding apparatus, such as a rotary turret compression molding machine, to substantially continuously sense the position of a compression cam of the apparatus, and to operate an associated force determining device, such as a pneumatic cylinder, in the event that excessive movement of the cam indicates a condition which would subject the components of the apparatus to excessive strain. Significantly, this is achieved through the use of a linear position transducer which provides a continuously variable output, and associated electronic controls, which operate in a highly consistent and reliable manner, while avoiding the need for precise adjustment of mechanical limit switches or the like. High-speed operation is thus facilitated, while avoiding undesirable down time.

The present method is directed to operating a plastic molding apparatus having a plastic mold which is movable relative to a compression cam, and reactive thereagainst for closing the mold. The method includes the steps of providing a force determining device, preferably in the form of a fluid pressure (pneumatic) cylinder operatively connected to the cam for holding the cam in position for effecting closing of the mold.

The present method further includes providing a sensor, in the form of a linear position transducer, for substantially continuously sensing the position of the compression cam, and for providing a range of outputs corresponding to a range of movement of said cam. In this manner, fluid pressure (i.e., air pressure) in the fluid pressure cylinder is released in response to the sensor sensing movement of the cam which indicates excessive loading of the plastic mold. As discussed above, such excessive loading typically results from metering of excessive plastic material into the mold assembly.

Because of the substantially continuously variable output provided by the linear position transducer, the present method can be practiced in different ways. In present practice, the system is operated such that the average position of the cam is sensed during operation of the molding apparatus, with the step of releasing fluid pressure effected when the sensor senses that the cam has moved beyond a predetermined position relative to the average position. Alternately, the system can be operated such that the step of releasing fluid pressure is effected when the rate in the change of the position (i.e., the velocity) of the compression cam exceeds a predetermined value.

An important feature of the present system is the fact that it avoids the need for precise adjustment for correct operation. This is achieved by operating the sensor within a predetermined range for sensing the position of the compression cam, with the controls continuously checking the sensor by determining that an average position of the compression cam, as sensed by the sensor, is sufficiently below an upper limit of the predetermined range to assure that the sensor can measure movement of the cam to or beyond the predetermined position at which fluid pressure is released.

Other features and advantages of the present invention will become readily apparent from the following detailed description, the accompanying drawings, and the appended claims.

BRIEF DESCRIPTION OF THE DRAWINGS

FIG. 1 is a diagrammatic view a system for preventing overload of a compression cam of a plastic molding apparatus embodying the principles of the present invention.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference to FIG. 1, therein is diagrammatically illustrated certain components of a rotary turret compression molding apparatus, and a control system embodying the principles of the present invention. This type of molding apparatus can be employed for molding plastic closures such as disclosed in U.S. Pat. No. 4,497,765, and U.S. Pat. No. 4,938,370, hereby incorporated by reference. The molding apparatus includes a plurality of mold tooling assemblies 10, with one being shown, with the illustrated mold tooling assembly including male mold tooling 12 and female mold 14. In operation, the mold assemblies are rotatably moved by disposition about the periphery of the rotary turret or carousel of the molding apparatus, with the male and female molds thereby moved relative to each other by respective compression cams, i.e., upper cam 16 and lower cam 18. By this movement, the mold assembly can be opened for depositing a predetermined quantity or pellet P of molten plastic material in the female mold, and for relatively moving the male and female molds for closing the mold and compression molding the plastic material, such as for forming an internally threaded plastic closure.

FIG. 1 diagrammatically illustrates the mold assembly 10 being moved toward that portion of upper cam 16 (which is typically pivotally movable) at which the upper cam 16 effects compression of the mold assembly for compression molding the plastic pellet P. In order to maintain the movable cam 16 in position for closing the mold assembly, a force determining device, illustrated as a fluid pressure (pneumatic) cylinder 20, is operatively connected with the upper cam 16. Fluid pressure in the cylinder 20 determines the force which the compression cam 16 exerts on the cam follower and the tooling of the mold assembly 10.

In accordance with the present invention, a monitoring system is provided for substantially continuously sensing the position of the upper compression cam 16. The system includes an analog linear position transducer 22, which in a current embodiment comprises a linear variable differential transformer (LVDT). It will be understood that other types of linear position transducers can be employed, including ultrasonic, optical, as well as other devices. The linear position transducer 22 is operatively connected with electronic controls 24, which in turn are operatively connected with a control valve 26 which controls the flow of fluid pressure out of fluid pressure cylinder 20. In a current embodiment, a Siemens S-5 Series programmable controller, using a 928B CPU, has been employed for the electronic controls 24.

In operation, the system senses and monitors the position of the movable upper compression cam 16, thereby monitoring and detecting the existence of excessive loading of plastic material in one of the mold assemblies 10. This is achieved by substantially continuously sensing and detecting the position of the upper compression cam 16 with the linear position transducer 22, and releasing fluid pressure in the fluid pressure cylinder 20 in response to the position transducer sensing movement of the compression cam 16 which indicates excessive loading of the plastic mold assembly. In present practice, the step of releasing fluid pressure is effected when the linear position transducer senses that the cam has moved beyond a predetermined position relative to an average position.

By virtue of the substantially continuously variable output provided by the linear position transducer 22 (which output may be proportional to the position of the compression cam, depending upon the type of transducer employed), in conjunction with the programmability of electronic controls 24, the present system can be operated in different modes to achieve the desired overload prevention. In one mode of operation, the step of sensing the position of the upper compression cam 16 includes sensing the average position of the cam during operation of the molding apparatus. The step of releasing fluid pressure to the fluid pressure cylinder 20 is effected when the linear position transducer senses that the compression cam has moved beyond the predetermined position relative to the average position of the compression cam.

In operation for this mode, the controls 24 are operated such that an analog conversion of the linear position is requested every scan time, which is approximately every 40 milliseconds. The running average is calculated by taking the current position measurement whenever an associated sensor detects a mold assembly passing by, and doing a simple arithmatic averaging of these measurements over the entire revolution of the molding apparatus.

Each time a measurement is taken, the current value of that measurement is compared to the current average. If the measurement exceeds the average by a set value, for three measurements in a row, an output flag bit is set to cause the fluid (pneumatic) pressure in cylinder 20 to be "dumped" (i.e., released) by operation of valve 26. The reason that three sequential measurements are required to be greater than the average before the pressure release action is taken is to filter out any noise that might cause "nuisance" outputs. Even with this noise filtering feature, the response of the system is on the order of 120 milliseconds.

In another mode of operation, the position transducer 22 is employed for monitoring the rate of change of the position (i.e., velocity) of the compression cam 16. For this mode of operation, the profile of the cam was analyzed, and a rate of change calculated for that case in which twice as much plastic was metered into the mold assembly than the amount of plastic which the mold properly receives. This was considered to be the normal "failure" mode. Then, if the rate of change height of the cam exceeded the calculated amount, the system reacts by releasing fluid pressure in cylinder 20 connected with the upper cam 16.

An important feature of the present system is the fact that proper operation is assured without precise adjustment of the system. The step of operation which entails sensing the position of the upper compression cam is achieved by operating the linear position transducer 22 within a predetermined range, with the system arranged such that the transducer must normally report a position well below the upper limit of its range of travel. Thus, the position transducer must be adjusted so that the average cam position sensed by the transducer is low enough within its predetermined range to permit measuring of the anticipated upward movement of the compression cam which is exhibited attendant to excessive loading of the mold assembly (this is sometimes referred to as providing sufficient "head room" for the sensing system). Thus, the electronic controls 24 of the system are programmed such that the apparatus can only be operated when the output from the linear position transducer 22 is sufficiently below the upper limit of the range to assure that excessive movement of the upper compression cam 60 is detected, and the system operates to release fluid pressure in the cylinder 20.

It is within the purview of the present invention to employ the present method for cam-actuated compression molding of liners in plastic closures.

From the foregoing, it will be observed that numerous modifications and variations can be effected without departing from the true spirit and scope of the novel concept of the present invention. It will be understood that no limitation with respect to the specific embodiment disclosed herein is intended or should be inferred. The disclosure is intended to cover, by the appended claims, all such modifications as fall within the scope of the claims.

What is claimed is:

1. A method of operating a plastic molding apparatus having a plastic mold movable relative to a cam and reactive thereagainst for closing the mold, the method comprising the steps of:

providing a fluid pressure force applying device, and operatively connecting said device to said cam for effecting closing of said mold;

placing plastic material in said mold, operating said apparatus to close said mold;

providing sensor means in the form of a linear position transducer providing an output which varies continuously corresponding to the position of said cam:

substantially continuously sensing the position of said cam and providing a range of outputs corresponding to a range of movement of said cam, releasing fluid pressure in said fluid pressure force applying device in response to said sensor means sensing movement of said cam which indicates excessive loading of plastic material into said plastic mold.

2. The method of operating a plastic molding apparatus in accordance with claim 1, wherein said releasing step is effected when said sensor means senses that said cam has moved beyond a predetermined position.

3. The method of operating a plastic molding apparatus in accordance with claim 1, wherein, said method includes calculating a rate of change of the position of said cam, said releasing step being effected when the rate of change of the position of said cam exceeds a predetermined value.

4. The method of operating a plastic molding apparatus in accordance with claim 1, wherein, said method including the step of checking said sensor means by determining that a normal position of said cam sensed by said sensor means is sufficiently below an upper limit of said range to assure that said sensor means is operable within said range when sensing movement of said cam which indicates excessive loading of said plastic mold.

5. The method of operating a plastic molding apparatus in accordance with claim 2, wherein said sensing step includes sensing an average position of said cam during operation of said molding apparatus, and said releasing step is effected when said sensor means senses that said cam moves beyond the predetermined position relative to said average position.

6. The method of operating a plastic molding apparatus in accordance with claim 1, wherein said sensing step includes providing sensor means in the form of an analog linear position transducer for providing an output which varies continuously corresponding to the position of said cam.

7. A method of operating a plastic molding apparatus having a plastic mold movable relative to a cam and reactive thereagainst for closing the mold, the method comprising the steps of:

providing a fluid pressure force applying device, and operatively connecting said device to said cam for effecting closing of said mold;

placing plastic material in said mold, operating said apparatus to close said mold;

providing a sensor in the form of a linear position transducer, substantially continuously sensing the position of said cam and providing a range of outputs corresponding to a range of movement of said cam, releasing fluid pressure in said fluid pressure force applying device in response to said transducer providing an output in response to movement of said cam beyond a normal position by a predetermined amount which indicates excessive loading of plastic material into said plastic mold, including permitting operation of said apparatus by determining that the output of said transducer is normally sufficiently below an upper limit of said range of outputs to permit measuring of the movement of said cam indicating excessive loading of said plastic mold.

8. The method of operating a plastic molding apparatus in accordance with claim 7, wherein said releasing step includes determining that a plurality of sequential values of the output from said transducer which correspond to movement of said cam beyond said predetermined position before releasing fluid pressure in said force applying device.

\* \* \* \* \*